United States Patent
Kam et al.

(10) Patent No.: US 9,209,645 B2
(45) Date of Patent: Dec. 8, 2015

(54) METHOD AND APPARATUS FOR CONTROLLING CHARGING OF SECONDARY BATTERY

(71) Applicant: Samsung SDI Co., Ltd., Yongin-si, Gyeonggi-do (KR)

(72) Inventors: Jae-Woo Kam, Yongin-si (KR); Yoon-Phil Eo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 331 days.

(21) Appl. No.: 13/830,093

(22) Filed: Mar. 14, 2013

(65) Prior Publication Data

US 2014/0132202 A1    May 15, 2014

(30) Foreign Application Priority Data

Nov. 14, 2012  (KR) .......................... 10-2012-0128723

(51) Int. Cl.
*H02J 7/00* (2006.01)

(52) U.S. Cl.
CPC ............. *H02J 7/0075* (2013.01); *H02J 7/0047* (2013.01); *H02J 7/0068* (2013.01); *H02J 2007/0049* (2013.01)

(58) Field of Classification Search
CPC ...... Y02E 60/12; H02J 7/0042; H02J 7/0045; H01M 10/46; H01M 10/44
USPC .......................................................... 320/107
See application file for complete search history.

(56) References Cited

U.S. PATENT DOCUMENTS

| | | | | |
|---|---|---|---|---|
| 2006/0164039 A1* | 7/2006 | Ukon | ............................ | 320/132 |
| 2008/0084189 A1* | 4/2008 | Kim | ............................ | 320/160 |
| 2009/0295332 A1 | 12/2009 | Yang et al. | | |
| 2010/0164439 A1* | 7/2010 | Ido | ................................ | 320/155 |
| 2011/0245987 A1* | 10/2011 | Pratt et al. | ..................... | 700/295 |

FOREIGN PATENT DOCUMENTS

| | | |
|---|---|---|
| KR | 10-2002-0080947 A | 10/2002 |
| KR | 10-2009-0026417 A | 3/2009 |
| KR | 10-2009-0126099 | 12/2009 |

* cited by examiner

*Primary Examiner* — Arun Williams
(74) *Attorney, Agent, or Firm* — Christie, Parker & Hale, LLP

(57) ABSTRACT

There is provided a method and apparatus for controlling charging of a secondary battery. The apparatus includes a receiving unit, a sensing unit and a charging controller. The receiving unit receives a full-charge time of the secondary battery from a user terminal. The sensing unit monitors a charging state of the secondary battery. The charging controller controls charging of the secondary battery, using the full-charge time and the charging state. Accordingly, the charging of a secondary battery is controlled to be completed at a full-charge time desired by a user, thereby preventing deterioration of the secondary battery.

6 Claims, 2 Drawing Sheets

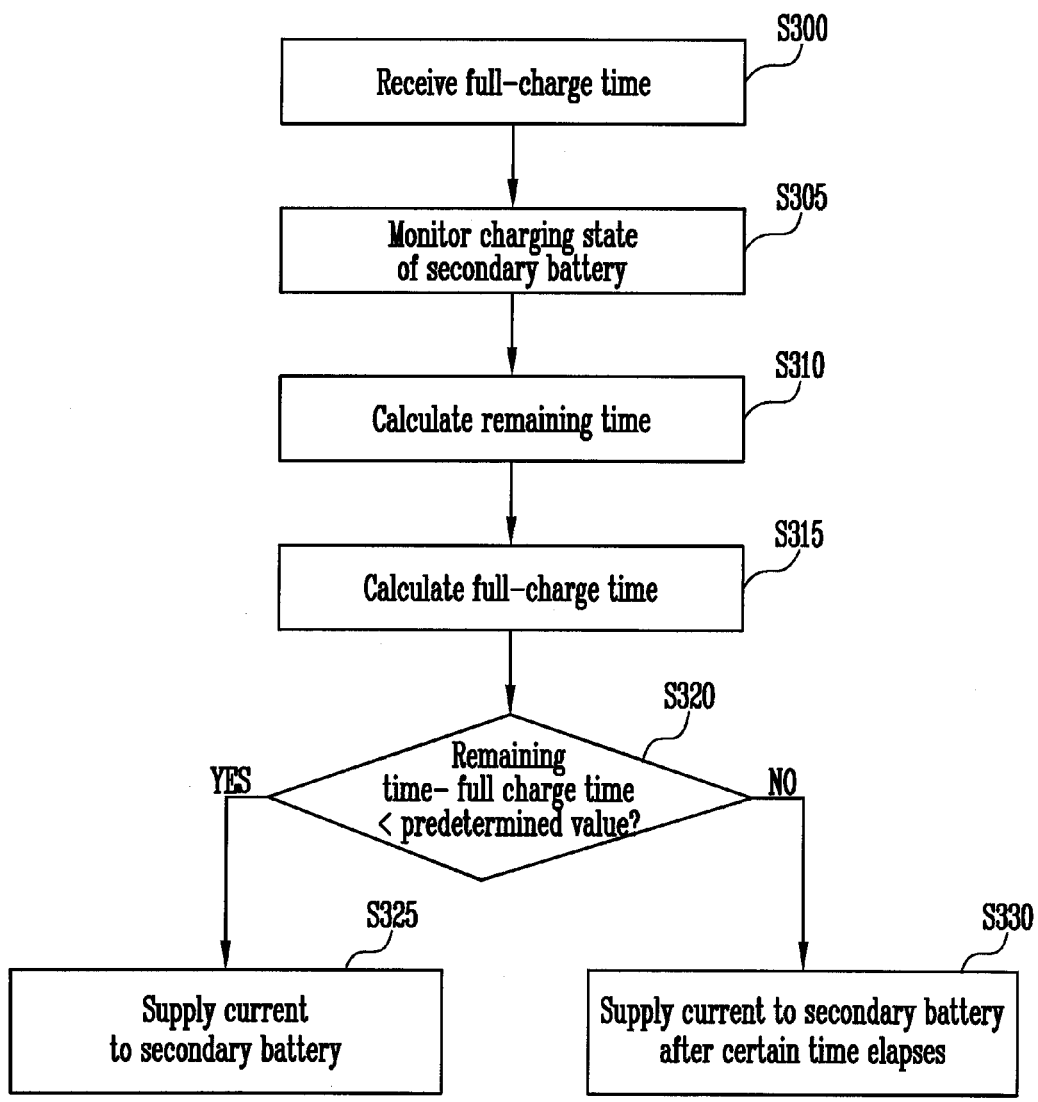

METHOD AND APPARATUS FOR CONTROLLING CHARGING OF SECONDARY BATTERY

CROSS-REFERENCE TO RELATED APPLICATION

This application claims priority to and the benefit of Korean Patent Application No. 10-2012-0128723, filed on Nov. 14, 2012, in the Korean Intellectual Property Office, the entire contents of which is incorporated herein by reference.

BACKGROUND

1. Field

An aspect of the present invention relates to a method and apparatus for controlling charging of a secondary battery.

2. Description of the Related Art

Recently, secondary batteries have been used as power sources of portable electronic devices in many fields, and accordingly, demands on secondary batteries have increased. Secondary batteries may be charged and discharged several times, and thus, are economically and environmentally effective.

When a secondary battery maintains a full-charge state, the deterioration of the secondary battery may be accelerated as compared with that when the secondary battery does not maintain the full-charge state, and therefore, the lifetime of the secondary battery is shortened. For example, with a secondary battery for a mobile device, the secondary battery may continuously maintain the full-charge state when a charging adapter is coupled to the secondary battery for a long period of time, and therefore, the deterioration of the secondary battery may be accelerated.

For example, when a user coupled a charging adapter to a mobile device before sleep and then leaves the mobile device coupled to the charging adapter until the next morning, the secondary battery maintains a full-charge state while continuously repeating full-charge and self-discharge states, until the user removes the charging adapter, and therefore, the deterioration of the secondary battery is accelerated.

SUMMARY

Embodiments of the present invention provide a method and apparatus for controlling charging of a secondary battery that prevents deterioration of the secondary battery.

According to an aspect of the present invention, there is provided an apparatus for controlling charging of a secondary battery, the apparatus including: a receiving unit configured to receive a full-charge time of the secondary battery from a user terminal; a sensing unit configured to monitor a charging state of the secondary battery; and a charging controller configured to control charging of the secondary battery according to the full-charge time and the charging state.

The charging controller may be configured to control current applied to the secondary battery so that the charging of the secondary battery is completed at the full-charge time.

The apparatus may further include a remaining time calculator configured to calculate a remaining time as a time remaining from when the full charge time is received to the full-charge time.

When an external power source is not coupled to the user terminal when the full-charge time is received, the remaining time calculator may be configured to calculate the remaining time as a time remaining from when the external power source is coupled to the user terminal to the full-charge time.

The apparatus may further include a full-charge time calculator configured to calculate a time to full of the secondary battery according to the charging state of the secondary battery and an intensity of the current applied to the secondary battery.

When a difference between the remaining time and the time to full is less than a set value, the charging controller may be configured to supply the current to the secondary battery.

When a difference between the remaining time and the time to full is greater than a set value, the charging controller may be configured to supply the current to the secondary battery after a time corresponding to the difference between the remaining time and the time to full elapses.

When the remaining time is greater than the time to full, the charging controller may be configured to control the intensity of the current supplied to the secondary battery.

The full-charge time may be an alarm time set by a user in the user terminal.

The charging state may include at least one of a full-charge capacity of the secondary battery, a discharging capacity of the secondary battery, or a remaining time of the secondary battery.

According to an aspect of the present invention, there is provided a method for controlling charging of a secondary battery, the method including: receiving a full-charge time of the secondary battery from a user terminal; monitoring a charging state of the secondary battery; and controlling charging of the secondary battery according to the full-charge time and the charging state.

The controlling of the charging of the secondary battery may include controlling current applied to the secondary battery so that the charging of the secondary battery is completed at the full-charge time.

The method of may further include calculating a remaining time as a time remaining from when the full-charge time is received to the full-charge time.

When an external power source is not coupled to the user terminal when the full-charge time is received, the calculating of the remaining time may include calculating the remaining time as a time remaining from when the external power source is coupled to the user terminal to the full-charge time.

The method may further include calculating a time to full of the secondary battery according to the charging state of the secondary battery and an intensity of the current applied to the secondary battery.

When a difference between the remaining time and the time to full is less than a set value, the controlling of the charging of the secondary battery may include supplying the current to the secondary battery, and when the difference between the remaining time and the time to full is greater than the set value, the controlling of the charging of the secondary battery may include supplying the current to the secondary battery after a time corresponding to the difference between the remaining time and the time to full elapses.

When the remaining time is greater than the time to full, the controlling of the charging of the secondary battery may include controlling the intensity of the current applied to the secondary battery.

As described above, according to the present invention, the charging of a secondary battery is controlled to be completed at a full-charge time desired by a user, thereby preventing deterioration of the secondary battery.

BRIEF DESCRIPTION OF THE DRAWINGS

The accompanying drawings, together with the specification, illustrate exemplary embodiments of the present invention that serve to explain aspects and features of the present invention.

FIG. 3 is a flowchart illustrating a method for controlling charging of a secondary battery according to an embodiment of the present invention.

DETAILED DESCRIPTION

Figure 1:
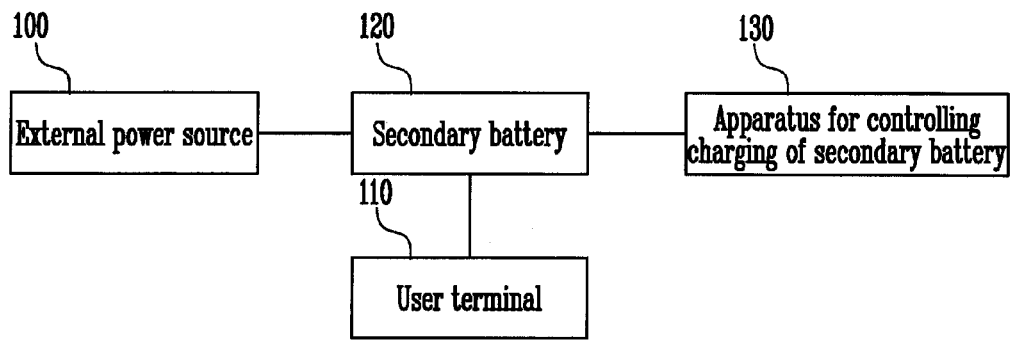
FIG. 1 is a block diagram schematically illustrating an apparatus for controlling charging of a secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "coupled to" (e.g., electrically coupled or connected to) another element, it can be directly coupled to the another element or be indirectly coupled to the another element with one or more intervening elements interposed therebetween. Hereinafter, like reference numerals refer to like elements.

Hereinafter, exemplary embodiments of the present invention will be described in detail with reference to the accompanying drawings.

FIG. 1 is a block diagram schematically illustrating an apparatus for controlling charging of a secondary battery according to an embodiment of the present invention.

Referring to FIG. 1, the apparatus 130 is coupled to a secondary battery 120 coupled to a user terminal 110 to control current applied to the secondary battery 120 from an external power source.

Here, the external power source 100 refers to a power source that applies current to the user terminal 110 and the secondary battery 120 to operate the user terminal 110 and to charge the secondary battery 120. For example, the external power source 100 may be an AC adapter coupled to the user terminal 110 to apply current to the user terminal 110, but the present invention is not limited thereto. That is, the external power source 100 may include all power sources capable of applying current to the user terminal 110.

The user terminal 110 may be a device, such as a cellular phone, personal digital assistant (PDA), MP3 player, portable multimedia player (PMP) or notebook computer, to which the secondary battery 120 is coupled. The user terminal 110 may include all electronic devices that are operated using power from the secondary battery 120.

The secondary battery 120 may be a chemical battery that can be repetitively charged and discharged by charging electrical energy as chemical energy (using the reversibility of an electrochemical reaction) and then discharging the chemical energy as electrical energy. The secondary battery 120 may include a lead storage battery, a nickel cadmium (NiCd) battery, a nickel metal hydride (NiMH) battery, a lithium ion battery (LiB), a lithium polymer battery (LiPB), etc.

When the external power source 100 is coupled to the user terminal 110 (to which the secondary battery 120 is coupled), a portion of the current supplied from the external power source 100 is used to operate the user terminal 110, and another portion of the current is used to charge the secondary battery 120. Here, if the secondary battery 120 maintains a full-charge state while continuously repeating full-charge and self-discharging states until a user removes the external power source 100 after the charging of the secondary battery 120 is completed, the deterioration of the secondary battery 120 is accelerated.

However, if the user sets a full-charge time of the secondary battery 120, the apparatus 130 according to an embodiment of the present invention controls the current applied to the secondary battery 120 so that the charging of the secondary battery 120 is performed at the full-charge time, thereby preventing the deterioration of the secondary battery 120.

Figure 2:
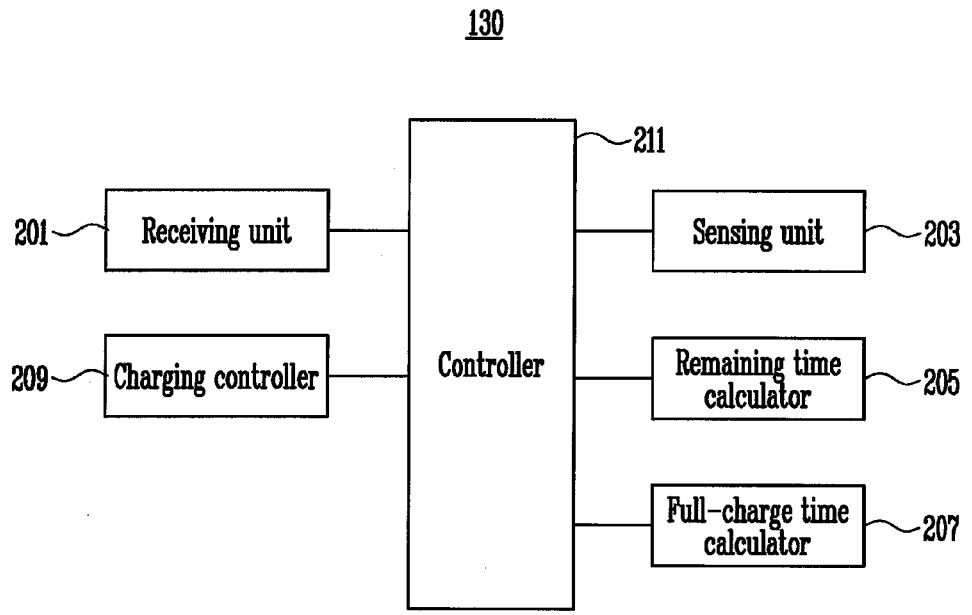
FIG. 2 is a block diagram illustrating a configuration of the apparatus according to an embodiment of the present invention.

FIG. 2 is a block diagram illustrating a configuration of the apparatus 130 according to an embodiment of the present invention.

Referring to FIG. 2, the apparatus 130 may include a receiving unit 201, a sensing unit 203, a remaining time calculator 205, a full-charge time calculator 207, a charging controller 209, and a controller 211.

The receiving unit 201 may receive a full-charge time of the secondary battery 120 from the user terminal 110.

The user may set a suitable (or desired) full-charge time through an input module of the user terminal 110. For example, the user may set the full-charge time of the secondary battery 120 to be 13 hours later, 7:00 AM, etc. According to an embodiment, the full-charge time may be an alarm time set by the user.

The sensing unit 201 monitors a charging state of the secondary battery 120.

Here, the charging state of the secondary battery 120 may include at least one of a full-charge capacity of the secondary battery 120, a discharging capacity of the secondary battery 120, or a remaining capacity of the secondary battery 120.

The battery remaining amount data (or remaining state of charge—RSOC) of the secondary battery 120 may be calculated according to the full-charge capacity and remaining capacity of the secondary battery 120. The battery remaining amount data (RSOC) may be expressed by the following Equation 1.

$$RSOC(\%) = (\text{Remaining Capacity}/\text{Full Charge Capacity}) \times 100 \quad \text{Equation 1}$$

The remaining time calculator 205 calculates a remaining time that is a time remaining until the charging of the secondary battery 120 is completed. For example, if the external power source 100 is coupled to the user terminal 110 when the full-charge time (which may be input to the user terminal 110 by the user) is received at the receiving unit 201, the remaining time calculator 205 may calculate a remaining time from the time when the full-charge time is received at the receiving unit 201 to the full-charge time.

On the other hand, if the external power source 100 is not coupled to the user terminal 110 at the time when the full-charge time is received at the receiving unit 201, the remaining time calculator 205 may calculate a time remaining from the time when the external power source 100 is coupled to the user terminal 110 to the full-charge time.

For example, in a case where the external power source 100 is coupled to the user terminal 110, the full-charge time input by the user is 7:00 AM, and the time when the full-charge time is received at the receiving unit 201 is 1:00 AM, the remaining time calculated by the remaining time calculator 205 is 6 hours (360 minutes).

According to an embodiment, in a case where the external power source 100 is not coupled to the user terminal 110 when the full-charge time is received at the receiving unit 201, the full-charge time input by the user is 7:00 AM, and the external power source 100 is coupled to the user terminal 110 at 2:00 AM, the remaining time calculated by the remaining time calculator 205 is 5 hours (300 minutes).

In this regard, the receiving unit 201 may receive connection information of the external power source 100 together with the full-charge time from the user terminal 100, or may receive the connection information of the external power source 100 whenever the connection relationship between the user terminal 110 and the external power source 100 changes.

The full-charge time calculator 207 calculates a time to charge the secondary battery 120 from its current state to its full state full. The calculation may be made according to the charging state of the secondary battery 120. Here, the time to full means a time required for the charging of the secondary battery 120 to be completed.

According to an embodiment, the full-charge time calculator 207 calculates a remaining capacity per minute A according to the current applied to the secondary battery 120 from the external power source 100, and calculates a requirement capacity B (i.e., the capacity required to complete charging of the secondary battery 120) according to the charging state of the secondary battery 120, and calculates a time to full $T_a$ according to the remaining capacity per minute A and the requirement capacity B.

Here, the requirement capacity B and the time to full $T_a$ may be expressed by the following Equations 2 and 3.

$$B = (\text{Full Charge Capacity} - \text{Remaining Capacity}) \text{ or } (100\% - RSOC) \qquad \text{Equation 2}$$

$$T_a = \frac{B}{A} \qquad \text{Equation 3}$$

The charging controller 209 controls the charging of the secondary battery 120 according to the full-charge time received at the receiving unit 201 and the charging state monitored by the sensing unit 203. For example, the charging controller 209 may control the current applied to the secondary battery 120 so that the charging of the secondary battery 120 is completed at the full-charge time.

According to an embodiment, in a case where the difference between the remaining time $T_b$ calculated by the remaining time calculator 205 and the time to full $T_a$ is greater than (or greater than or equal to) a set (or a predetermined or suitable) value, the charging controller 209 cuts off (or doesn't supply) the current supplied to the secondary battery 120. In a case where the difference between $T_b$ and $T_a$ is less than the predetermined value, the charging controller 209 supplies the current to the secondary battery 120.

That is, in a case where the difference between $T_b$ and $T_a$ is greater than the set value, the charging controller 209 cuts off the current supplied to the secondary battery 120, thereby preventing the charging of the secondary battery 120 from being completed before the full-charge time. In a case where the difference between $T_b$ and $T_a$ is less than the set value, the charging controller 209 supplies the current to the secondary battery 120, thereby controlling the charging of the secondary battery 120 to be completed at a user's desired time (e.g., the full-charge time).

For example, when the current time is 1:00 AM, the full-charge time is 6:00 AM, the time to full is 200 minutes, and the set value is 10 minutes, the remaining time is 300 minutes, and the difference between the remaining time and the time to full is 100 minutes. Therefore, the charging controller 209 does not perform the charging of the secondary battery 120.

However, if instead, the time to full is 295 minutes, then the difference between the remaining time and the time to full is 5 minutes (which is less than the set value of 10 minutes), and therefore, the charging controller 209 starts charging the secondary battery 120 by supplying the current to the secondary battery 120.

According to an embodiment, when the difference between the remaining time and the time to full is greater than the set value, the charging controller 209 may supply the current to the secondary battery 120 after a certain time elapses. Here, the certain time may mean a time obtained by subtracting the set value from the difference between the remaining time and the time to full. For example, in a case where the difference between the remaining time and the time to full is 100 minutes and the set value is 10 minutes, the charging controller 209 may control the current to be supplied to the secondary battery 120 after 90 minutes elapse. According to an embodiment of the present invention, the charging controller 209 may control the current to be supplied to the secondary battery 120 after a time corresponding to the difference between the remaining time and the time to full elapses.

According to an embodiment of the present invention, in a case where the remaining time is greater than the time to full, the charging controller 209 may control the intensity of the current supplied to the secondary battery 120.

For example, the charging controller 209 may decrease the charging speed of the secondary battery 120 by lowering the intensity of the current supplied to the secondary battery 120 from the external power source 100 so that the charging of the secondary battery 120 may be completed at the full-charge time. Here, the charging controller 209 may calculate a remaining capacity per minute A according to the requirement capacity B and the remaining time $T_b$, and may determine the intensity of current so that the charging of the secondary battery is completed at the full-charge time according to the remaining capacity per minute A.

Here, the remaining capacity per minute may be expressed by the following Equation 4.

$$A = \frac{B}{T_b} \qquad \text{Equation 4}$$

The controller 211 may control the receiving unit 201, the sensing unit 203, the remaining time calculator 205, the full-charge time calculator and the charging controller 209.

As the charging of the secondary battery 120 is completed at a user's desired full-charge time as described above, the charging and discharging of the secondary battery 120 may not be repeated in a time when the user does not use the user terminal 110, such as sleep or conference, thereby preventing the deterioration of the secondary battery 120.

Hereinafter, a charging control method of the apparatus 130 according to an embodiment of the present invention will be described in detail.

FIG. 3 is a flowchart illustrating a method for controlling charging of a secondary battery according to an embodiment of the present invention.

First, the receiving unit 201 receives a full-charge time for the secondary battery 120 from the user terminal 110 (S300).

The full-charge time may be input by a user through the user terminal 110. According to an embodiment, the full-charge time may be an alarm time set in the user terminal 110.

The sensing unit 203 monitors a charging state of the secondary battery 120 (S305).

Here, the charging state may include at least one of a full-charge capacity of the secondary battery 120, a discharging capacity of the secondary battery 120, or a remaining capacity of the secondary battery 120.

The remaining time calculator 205 calculates a remaining time required from the time when the full-charge time is received to the receiving unit 201 to the full-charge time (S310). In a case where the external power source 100 is not coupled to the user terminal 110 at the time when the full-charge time is received at the receiving unit 201, the remaining time calculator 205 may calculate a remaining time from the time when the external power source 100 is coupled to the user terminal 110 to the full-charge time.

The full-charge time calculator 207 calculates a time to full of the secondary battery 120 according to the charging state of the secondary battery 120 and the intensity of current applied to the secondary battery 120 (S315).

The charging controller 209 determines whether or not the difference between the remaining time and the time to full is less than a set value (S320).

When the difference between the remaining time and the time to full is less than a set value, the charging controller 209 controls the charging of the secondary battery 120 to be completed at the full-charge time by supplying current to the secondary battery 120 (S325).

When the difference between the remaining time and the time to full is greater than a set value, the charging controller 209 supplies the current to the secondary battery 120 after a time corresponding to the difference between the remaining time and the time to full elapses (S330).

According to another embodiment, when the remaining time is greater than the time to full, the charging controller 209 may control the charging of the secondary battery 120 to be completed at the full-charge time by lowering the intensity of the current supplied to the secondary battery 120.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An apparatus for controlling charging of a secondary battery, the apparatus comprising:
    a receiving unit configured to receive a full-charge time of the secondary battery from a user terminal;
    a sensing unit configured to monitor a charging state of the secondary battery; and
    a charging controller configured to control charging of the secondary battery according to the full-charge time and the charging state;
    a remaining time calculator configured to calculate a remaining time as a time remaining from when the full-charge time is received to the full-charge time; and
    a full-charge time calculator configured to calculate a time to full of the secondary battery according to the charging state of the secondary battery and an intensity of a current applied to the secondary battery,
    wherein the charging controller is configured to control the current applied to the secondary battery so that the charging of the secondary battery is completed at the full-charge time,
    wherein, when an external power source is not coupled to the user terminal when the full-charge time is received, the remaining time calculator is configured to calculate the remaining time as a time remaining from when the external power source is coupled to the user terminal to the full-charge time,
    wherein, when a difference between the remaining time and the time to full is less than a set value, the charging controller is configured to supply the current to the secondary battery, and
    wherein, when a difference between the remaining time and the time to full is greater than a set value, the charging controller is configured to supply the current to the secondary battery after a time corresponding to the difference between the remaining time and the time to full elapses.

2. The apparatus of claim 1, wherein, when the remaining time is greater than the time to full, the charging controller is configured to control the intensity of the current supplied to the secondary battery.

3. The apparatus of claim 1, wherein the full-charge time is an alarm time set by a user in the user terminal.

4. The apparatus of claim 1, wherein the charging state comprises at least one of a full-charge capacity of the secondary battery, a discharging capacity of the secondary battery, or a remaining time of the secondary battery.

5. A method for controlling charging of a secondary battery, the method comprising:
    receiving a full-charge time of the secondary battery from a user terminal;
    monitoring a charging state of the secondary battery; and
    controlling charging of the secondary battery according to the full-charge time and the charging state;
    calculating a remaining time as a time remaining from when the full-charge time is received to the full-charge time,
    calculating a time to full of the secondary battery according to the charging state of the secondary battery and an intensity of a current applied to the secondary battery,
    wherein the controlling of the charging of the secondary battery comprises controlling the current applied to the secondary battery so that the charging of the secondary battery is completed at the full-charge time,
    wherein, when an external power source is not coupled to the user terminal when the full-charge time is received, the calculating of the remaining time comprises calculating the remaining time as a time remaining from when the external power source is coupled to the user terminal to the full-charge time,
    wherein, when a difference between the remaining time and the time to full is less than a set value, the controlling of the charging of the secondary battery comprises supplying the current to the secondary battery, and
    wherein, when the difference between the remaining time and the time to full is greater than the set value, the controlling of the charging of the secondary battery comprises supplying the current to the secondary battery after a time corresponding to the difference between the remaining time and the time to full elapses.

6. The method of claim 5, wherein, when the remaining time is greater than the time to full, the controlling of the charging of the secondary battery comprises controlling the intensity of the current applied to the secondary battery.

* * * * *